July 11, 1961

H. E. FISHER 2,992,301

ELECTRICAL MEASURING INSTRUMENTS

Filed May 18, 1959

INVENTOR
Henry Ernest Fisher
BY
Pierre Scheffler & Parker.
ATTORNEYS

July 11, 1961

H. E. FISHER 2,992,301

ELECTRICAL MEASURING INSTRUMENTS

Filed May 18, 1959

INVENTOR
Henry Ernest Fisher
BY
Pierce, Scheffler & Parker
ATTORNEY

United States Patent Office 2,992,301
Patented July 11, 1961

2,992,301
ELECTRICAL MEASURING INSTRUMENTS
Henry Ernest Fisher, Slough, England, assignor to Taylor Electrical Instruments Limited, Slough, England
Filed May 18, 1959, Ser. No. 813,882
Claims priority, application Great Britain May 21, 1958
6 Claims. (Cl. 200—56)

This invention relates to electrical measuring instruments employing moving systems, the movement of which is in accordance with a current or similar quantity to be measured or indicated. An example of an instrument of this kind to which the invention is particularly applicable is a moving coil ammeter or the like. It is the object of the invention to provide certain improvements in instruments of this kind.

In accordance with one feature of the invention there is provided a mechanism for protecting the moving part which hereinafter will be referred to generally, for convenience, as the armature and/or the electrical parts of the instrument, against excessive mechanical forces arising in the event of an excessive current being applied to the coil.

The invention consists broadly of an electrical measuring instrument comprising an armature, a movable abutment means adapted to be engaged and moved by said armature on excessive movement thereof, electric contacts, an actuating member for said contacts biased to one position, a latching member for retaining said actuating member away from said position, and trip means operated by said abutment means on movement thereof for releasing said latching member.

The invention further includes an electrical measuring instrument comprising an armature adapted to move over a normal range of movement, movable abutment means adapted to be engaged and moved by said armature on movement past either limit of said normal range of movement, electric contacts, an actuating member for said contacts biased to one position, a latching member for retaining said actuating member away from said position, and trip means operated by said abutment means on movement thereof past either limit of said normal range of movement for releasing said latching member.

Other features and advantages of the invention will appear from the following description of one embodiment of the invention, given by way of example, in conjunction with the accompanying drawings, in which.

Figure 1:
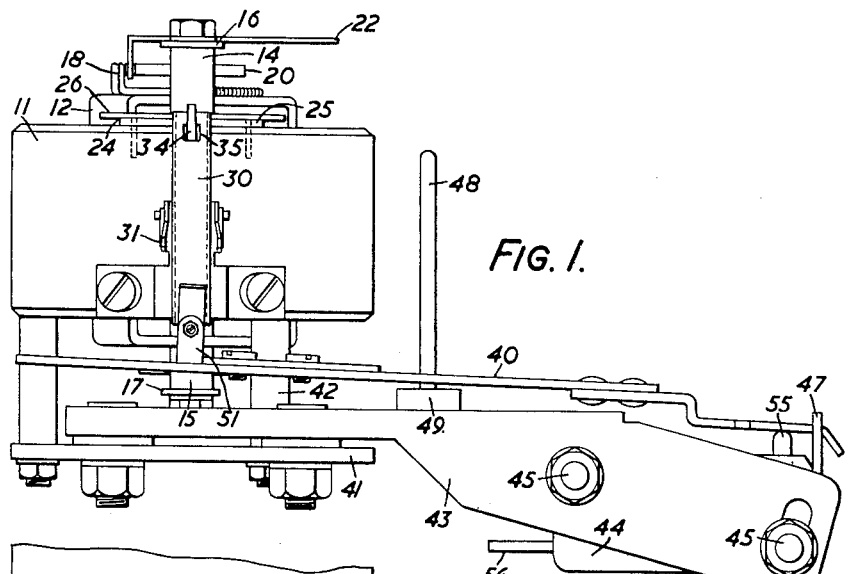
FIGURE 1 is a fragmentary side view of a moving coil instrument, showing the protective cut-out system.

This embodiment of the invention is a sensitive moving coil instrument, of the pointer type. The magnetic system of the instrument includes a central, cylindrical permanent magnetic member 10 which is disposed cylindrically within an outer cylindrical sleeve 11 of a high permeability magnetic material. On the diametrically opposite curved surfaces of the permanent magnet are pole pieces in the form of sections of a cylinder, closely in contact with the magnet and forming with them the cylindrical body 10. The pole pieces do not extend completely around the periphery of the magnet, but are limited in their angular extent to an angle which is slightly greater than the desired extent of movement of the moving coil 12.

The magnet body 10 is mounted by bridge members 13, one at each end, held to the body of the sleeve 11 by pillar screws 14, 15.

The moving coil 12 is rectangular and is suitably mounted about an axis concentric with the centre of the permanent magnet body 10, for movement in the gap between the pole pieces and the outer magnetic member, by pivots on the coil assembly which engage corresponding pivots carried in yoke members 16, 17. In the usual way, a suitable pointer 18 is biased normally to a zero point of the instrument by means of return springs 20, 21. Suitable electrical connections are made to the coil, and a zero adjuster 22 is incorporated. Resilient stops 23 are provided to limit the extent of normal movement of the coil but in the event of an excessive current being applied to the coil the coil will move with considerable force against one or other of these stops and in the absence of special means might well be damaged and the coil and associated electrical currents might be burnt out.

Figure 2:
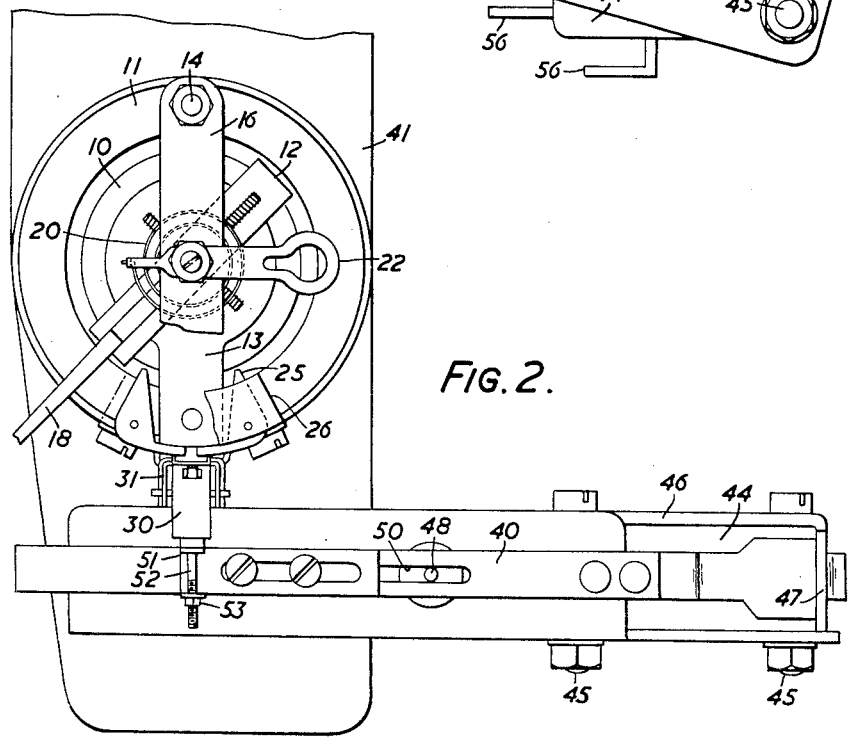
FIGURE 2 is a plan view of the parts shown in FIGURE 1, partly cut away.
Figure 3:
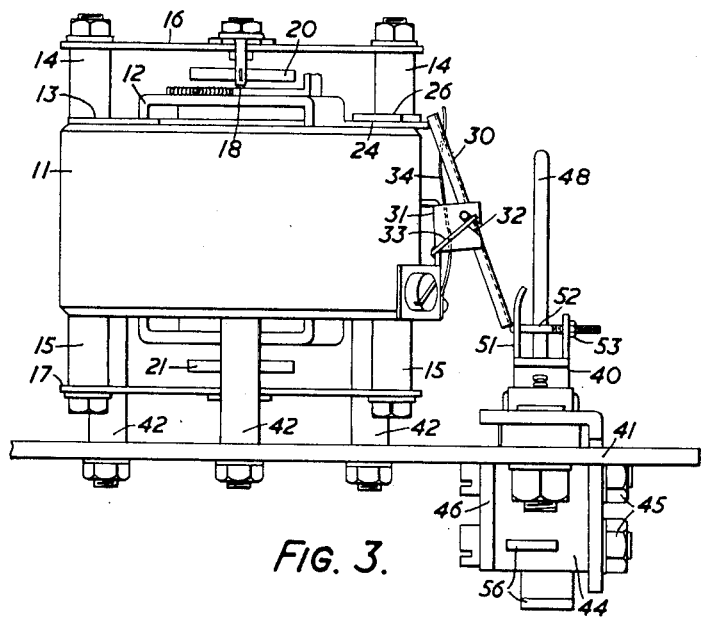
FIGURE 3 is an end view of the parts shown in FIGURES 1 and 2.

To prevent such damage arising means are provided to open contacts which are included in a suitable circuit of the instrument, in the main circuit and/or in the circuit of the moving coil. It may also be arranged to short circuit the moving coil in the event of overload. These means include two small pallets which are arranged so that their ends will project into the path of the moving coil and one or other will be struck by the moving coil in the event of overload in one or other direction through the coil. The pallets are approximately L-shape, as shown in FIGURE 2, and are pivoted on small hardened pivot pins driven into sleeve 11 to move in a horizontal plane; when an overload current in the forward direction is passed through the coil then, if the movement is of the kind in which the pointer moves clockwise from its zero position, the coil will strike the inner end of the pallet 25. This pallet will pivot so that its outer end will move radially outward. In a similar way, the end of pallet 24 will move outwardly if an overload reverse current is passed through the coil.

The pallets are very light and move freely; they are held on their pivot pins by a small plate 26 held by one of the pillar screws 14. The bridge member 13 forms a spacer, so that the pallets are free.

When either of the pallets is moved in this way, the outer end of the pallet is arranged to pivot a trip lever and thereby to unlatch a spring loaded switch. The trip lever consists of a short lever 30, pivoted at its mid-point, and lying roughly parallel to the axis of movement of the coil, immediately adjacent the outer surface of the annular member 11 of the magnetic circuit. The pivot for the lever is carried in a small metal stirrup 31 which is secured to the outer surface of the annular member. It is important that the pivot for the trip lever should be well defined and without undue play, and this is achieved by slotting the stirrup at 32 to receive a pivot pin on the lever, the pin being held against the ends of the slots by a spring wire 33. A light leaf spring 34 is used to bias the upper end of the trip lever against the outer ends of both the pallets; one end of the spring is riveted to the stirrup and the other is passed through an opening 35 in the lever.

The lower end of the trip lever is arranged to lie in the path of the operating arm 40 of the spring loaded switch. A mounting plate 41 is secured to the sleeve 11 by pillar screws 42, and bolted to this plate is a bracket 43. The switch 44 is bolted to the bracket by bolts 45, and these bolts serve to hold also a small angle plate 46. The end of the switch arm 40 is pivoted in plate 46 by a tongue and slot pivot at 47, and the arm 40 is guided by a hardened rod 48 secured to the bracket 43 at 49, and passing through a fitting slot 50 in the arm. This avoids any lateral play of the arm 40 as it pivots.

The arm 40 carries at its end adjacent the lower end of the trip lever a small U-shaped yoke 51, the arms of the yoke being spanned by an adjustable stop in the form of a hardened steel pin 52. The pin is secured in one of the arms of the yoke and projects through the other of the arms; the extent of the projection from the arm, and hence the projection into the path of the trip lever is adjustable by a threaded portion on the pin entering a correspondingly threaded hole in the arm of the yoke. The pin can be locked in the adjusted position by lock nut 53.

The spring loaded switch 44 is of the microswitch type and its contacts are chosen in accordance with the particular operation which it is desired to effect when the cut out of the instrument is operated. The switch shown has a pair of contacts which are closed when pressure is applied to the operating button 55 by the lever 40. Terminals 56 are provided for the contacts.

The cut out is brought into its normal position by depressing the operating arm 30 of the switch, for example, by means of a manually operable press button which engages the end of the lever 40 at 57, which allows the trip pin 52 to pass beneath the end of the trip lever 30. The contacts of the switch are then operated and are maintained in this operated position until such time as an overload occurs. Upon overload, one of the pallets 24 or 25 will be pivoted thereby pivoting the trip lever 30 and releasing it from the end of the pin 52; the operating lever 40 can then rise under the force of the microswitch return spring, and actuate the contacts as desired.

It is a matter of considerable difficulty to devise a protective cut out system for an instrument of the kind described, since the requirements for such a cut out are conflicting. For example, the more sensitive and delicate a movement, the more is a protective cut out required, but the more sensitive the instrument the less power will be available from the armature of the instrument to operate the cutout. Again, the contacts used in the cut out must be robust and present a low electrical resistance as they will probably be included in the instrument circuits and may affect the accuracy of the instrument. This means that a reasonable contact pressure must be used, and this increases the load on the trip mechanism.

It is also important that while the cut out must be very sensitive to electrical overload, it should be insensitive to mechanical. It is tiresome if an instrument repeatedly trips in use, due to vibration or light shocks.

The cut out described has been found very satisfactory in these respects; it is sensitive, reliable and not easily tripped by vibration. It appears that one factor contributing to these advantages is that the switch lever and trip lever are guided and pivoted so that play is minimised; a further factor is the arrangement adopted for the engaging parts of the trip lever and the trip pin.

Figure 4:
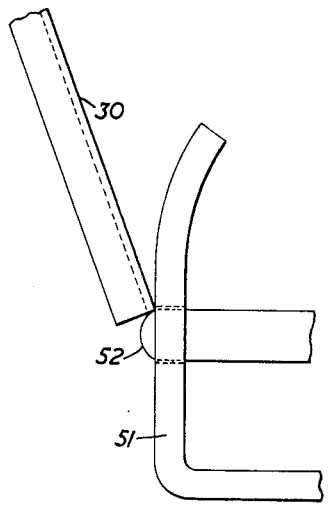
FIGURE 4 is a scrap view, on an enlarged scale, of the trip pin and trip lever.

These parts are shown more clearly in FIGURE 4. As this figure shows, the trip lever is formed of a thin sheet metal, the lever being channel shaped to give it the necessary stiffness; beryllium copper is a suitable material. Also, the end of the pin is rounded, approximately hemispherically. This rounding of the end of the pin affords a very precise adjustment of the pin, both as to projection and angle of contact with the trip lever, enabling a satisfactory compromise between sensitivity and stability to be obtained. Moreover, it is found that considerable wear of the end of the trip lever can occur without appreciable effect on operation, and should such wear occur readjustment can easily be carried out.

The arrangement of the trip lever with its length, between the pivot point and the tip which engages the pin, at an acute angle to the direction of movement of the switch lever is also advantageous in this respect.

In an instrument of the type described, it is highly desirable that each instrument should be so made that the pointer can be made to conform to a standard scale used for the meters as otherwise individual and expensive adjustment, or hand calibration of the scale may be necessary. In an instrument of the type described I have found that it is possible by suitable manufacturing methods to achieve a range of linearity of deflection which is attainable over the desired range of the instrument, but that it cannot be guaranteed from instrument to instrument that the magnetisation which takes place is in such a direction that the range of linearity will coincide with the angle through which the pointer moves. In accordance with a feature of the invention, means are provided for adjusting the magnetic system of the instrument so that this desired coincidence can be obtained. One method of achieving this object is to mount the permanent magnet so that it is angularly rotatable, over a limited angle with respect to the outer annular member. The magnet can be mounted by means of a pair of mounting members of non-magnetic material which engage the circular end faces of the magnet and are held in concentric position by extensions of the pole pieces. Once adjusted, the magnet can be secured in the desired position by a suitable adhesive, such as a synthetic resin.

With the instrument described it is also possible to vary the sensitivity of the instrument by a magnetic shunt extending from the annular member inwardly towards the permanent magnet. However, and in accordance with a feature of the invention, this magnetic shunt, consisting of a threaded slug which fits within a corresponding hole in the annular member, is arranged adjacent the gap between the pole pieces as described above. The slug is of a high permeability material, and with such arrangement it is found that the sensitivity can be altered without affecting the scale shape of the instrument. This is a very important practical advantage of the sensitivity adjustment described.

I claim:

1. In an electrical measuring instrument having a frame and an armature rotatably connected to said frame, a switch supported by said frame and having a pair of switch contacts, switch contact actuating means connected to said frame for operating said switch contacts, said switch contact actuating means including an actuating member normally biased to a first position to maintain said switch contacts in one electrical condition, latching means releasably positioning said actuating means in a second position to maintain said switch contacts in a second electrical condition, said latching means including a latching member, and abutment means connected to said frame adjacent said armature for engagement thereby upon excessive movement of said armature for release of said latch means; the improvement wherein one of said actuating and latching members has a projection thereon engaged by an edge portion of the other of said members, said projection having a curved surface adjacent the point of contact with said edge portion, said projection being adjustably connected to said one member for varying the effective angle of contact between said projection and said edge.

2. Apparatus as defined in claim 1 wherein said latching member and said actuating member are pivotally connected to said frame.

3. Apparatus as defined in claim 2 wherein said abutment means consists of at least two abutment members peripherally spaced relative to the path of rotation of said armature for engagement thereby when said armature rotates in either direction to either of two positions of excessive movement, each of said abutment members being arranged to trip said single latching member.

4. Apparatus as defined in claim 2 and further including pin and slot guide means for guiding said actuating member in its plane of pivotal movement and thus prevent movement of said lever in a direction transverse to its pivotal movement.

5. Apparatus as defined in claim 2 wherein when said instrument is in its latched condition, said latching member is inclined at an acute angle to the plane of pivotal movement of said actuating member.

6. Apparatus as defined in claim 5 wherein said latching member is channel shaped and is formed of a thin metal sheet.

References Cited in the file of this patent

UNITED STATES PATENTS

| | | |
|---|---|---|
| 2,112,092 | Harrison | Mar. 22, 1938 |
| 2,543,680 | Veevers et al. | Feb. 27, 1951 |
| 2,565,312 | Lamb | Aug. 21, 1951 |